April 2, 1957     A. M. STENGER     2,787,482

RETAINER FOR A MEMBER ON A SHAFT

Filed Jan. 29, 1952

INVENTOR
AUGUST M. STENGER
BY
HIS ATTORNEY

United States Patent Office 2,787,482
Patented Apr. 2, 1957

2,787,482
RETAINER FOR A MEMBER ON A SHAFT

August M. Stenger, Painted Post, N. Y., assignor to Ingersoll-Rand Company, New York, N. Y., a corporation of New Jersey Application January 29, 1952, Serial No. 268,876

4 Claims. (Cl. 287—52.05)

This invention relates to a retainer for a member on a shaft and more particularly to a retainer for holding a pair of members on a shaft against rotational and longitudinal movement of the members relative to the shaft.

One conventional method of securing a member or pair of members on a shaft against such movement is to provide an inclined or tapered surface on the shaft and a complementary surface in the bore of the member. The member is then forced into frictional engagement with the tapered surface by means of a nut threaded on the shaft. The obvious disadvantage associated with such an arrangement is that it requires the shaft to be tapered and threaded. This is especially undesirable where it is necessary to secure the member to an intermediate portion of the shaft.

It is accordingly one object of the present invention to provide a retainer for securing a pair of members to a shaft of uniform diameter at any point along its length.

Another object of this invention is to provide a retainer of simple and inexpensive design.

Figure 1:
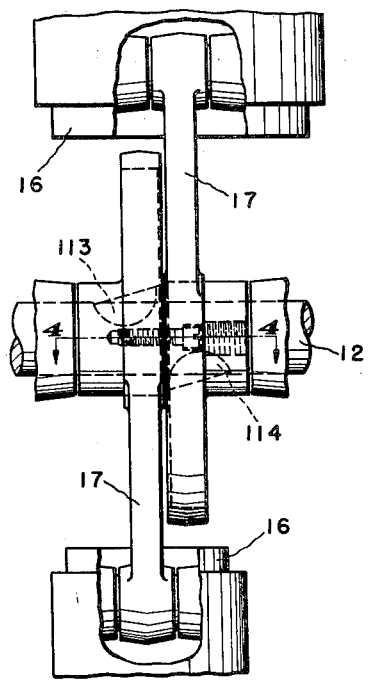
Figure 2:
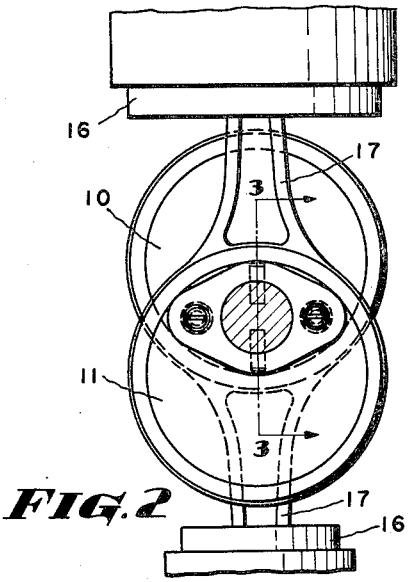
Figure 4:
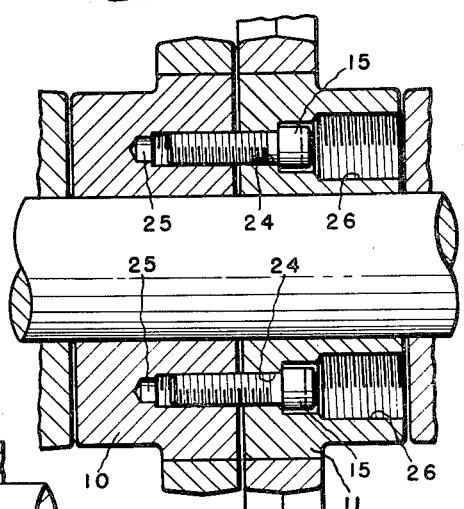
Figure 3:
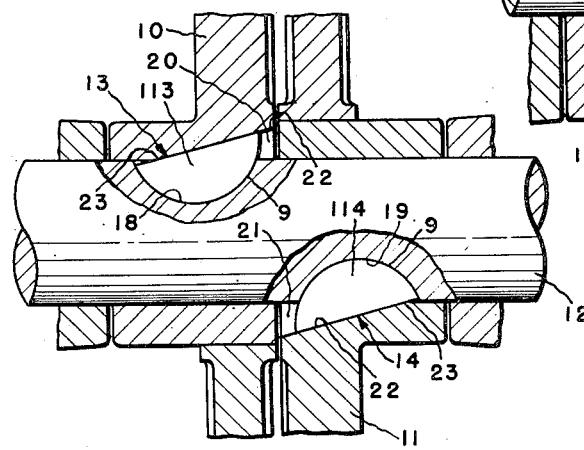

Further objects of this invention will become obvious from the following specification and drawings, in which, Figure 1 is a side view of a pair of members mounted on a shaft and retained against rotational and longitudinal movement relative to the shaft by a preferred form of the invention, Fig. 2 is an end view of the arrangement shown in Figure 1, Fig. 3 is a view taken through Fig. 2 along the lines 3—3 looking in the direction of the arrows, and Fig. 4 is a view taken through Fig. 1 along the lines 4—4 looking in the direction of the arrows.

Referring to the drawings, a preferred form of the retainer is shown adapted to a pair of members 10 and 11 mounted in juxtaposition on a shaft 12. The retainer is adapted to prevent longitudinal and rotational movement of the members 10 and 11 relative to the shaft 12 and comprises, generally, means, such as the wedge 13, between the shaft 12 and the member 10 to prevent the longitudinal movement of the member 10 along the shaft in one direction only, in this instance, toward the member 11. Similar means, such as the wedge 14, is provided between the member 11 and the shaft 12 for preventing movement of the member 11 along the shaft in the opposite direction—that is, toward the member 10. Means, such as the bolts 15, are provided for securing the members 10 and 11 together against longitudinal movement relative to each other.

With this arrangement, then, it is clear that the members 10 and 11 are secured against longitudinal movement relative to the shaft 12. The member 10 is prevented from longitudinal movement in one direction (to the right as viewed in Fig. 1) by the wedge 13 and in the opposite direction by the member 11 to which it is secured. The member 11, on the other hand, is prevented from longitudinal movement in one direction (to the left) by the wedge 14 and being secured against longitudinal movement relative to the member 10, it is prevented from longitudinal movement relative to the shaft in the opposite direction (to the right). As it will appear from the following discussion, the wedges 13 and 14 are so arranged that not only do they prevent longitudinal movement of the members 10 and 11, they also prevent rotational movement of these members relative to the shaft 12.

Referring in greater detail to the construction of the retainer, the members 10 and 11 are shown by way of illustration in the form of eccentrics for driving pistons 16 through connecting rods 17 connected therebetween. The retainer for securing the eccentrics to the shaft includes a pair of slots 18 and 19 formed at longitudinally disposed positions in the periphery of the shaft 12. The slots 18 and 19 are of arcuate shaped form with substantially parallel sides for the reception of arcuate shaped (Woodruff) keys 113 and 114 respectively. The curved edges or portions 9 of the keys 113 and 114 have the same radius as that of the curved boundries of the slots 18 and 19 but the length of such edges 9 on the keys 113 and 114 exceed the length of the curved boundries of the slots 18 and 19. Thus, when the keys 113 and 114 are positioned in the slots 18 and 19, a portion of each of the keys extends out of the slots into grooves 20 and 21, respectively, formed in the eccentrics 10 and 11, respectively, and registering, respectively, with the slots 18 and 19. The grooves 20 and 21 are formed with substantially parallel sides and of substantially the same width as the slots 18 and 19. Moreover, the bottom surfaces 22 of the grooves are inclined with respect to the surface or longitudinal axis of the shaft 12. In other words, the grooves are wedge-shaped and positioned with the narrow ends of the grooves pointing away from each other or in the outward direction when the eccentrics 10 and 11 are placed in their operative positions (see Fig. 3).

With this arrangement, when the keys 113 and 114 are placed in their respective slots 18 and 19 and the eccentrics are moved into position with the keys 113 and 114 extending into the slots 18 and 19, respectively, the keys are tilted, or cocked, in the slots with the flat edges 23 of the keys abutting the bottom surfaces 22 of the grooves 20 and 21. Accordingly, the keys form wedges which limit longitudinal movement of the eccentrics relative to the shaft in a direction toward each other.

In order to prevent movement of the eccentrics in a direction away from each other, such that they would move off of the wedges of the keys 113 and 114, perforations 24 are provided in one of the eccentrics for the reception of the bolts 15 which are threaded in holes 25 in the other eccentric. Tightening of the bolts 15 draws the eccentrics 10 and 11 into firm engagement with the keys 113 and 114 so that the eccentrics are engaged on the shaft 12 against rotational or longitudinal movement in either direction relative thereto.

It is to be noted that with this arrangement the general position of the eccentrics 10 and 11 on the shaft 12 is determined by the position of the slots 18 and 19 on the shaft. However, minor adjustments of the longitudinal positions of the eccentrics 10 and 11 relative to the shaft 12 may be obtained by varying the length of the curved portions 9 of the keys 113 and 114.

In order to permit ease in removing the eccentrics from the wedges 113 and 114, the outer end portion 26 of the perforations 24 are somewhat enlarged and are threaded to receive bolts (not shown) which bear on the heads of the bolts 15. Accordingly, when it is desired to remove the eccentrics, it is merely necessary to back off the bolts 15 a few turns and then thread the bolts (not shown) in the enlarged portions 26 thereby moving the bolts 15 in a direction toward the eccentric 11. This forces the two eccentrics 10 and 11 apart moving them out of engagement with the wedges 113 and 114.

While I have shown and described a specific form of my invention, it is to be understood that various changes and modifications may be made without departing from the spirit of the invention as set forth in the appended claims.

I claim:

1. The combination of a shaft, a pair of members in juxtaposition on the shaft, said shaft having a pair of longitudinally disposed slots therein, each of said members having grooves therein registering with said slots, keys in said slots and extending into said grooves, the said slots, grooves and keys being so arranged as to prevent relative movement of said members along the shaft toward each other, one of said members having a perforation therethrough, the other of said members having a threaded hole therein, a bolt extending through said perforation and threaded in said hole to secure said members against longitudinal movement therebetween, one end portion of said perforation being of enlarged diameter and being threaded to receive a bolt for moving the first said bolt in a direction toward said other member.

2. The combination of a shaft, a pair of members in juxtaposition on the shaft, said shaft having a pair of longitudinally disposed arcuate shaped slots therein having substantially parallel sides, each of said members having grooves therein registering with said slots and having substantially parallel sides and being substantially the same width as the width of said slots, said grooves having straight bottom surfaces inclined with respect to the longitudinal axis of said shaft with the deep ends of said grooves opening on the sides of the members which face each other, arcuate shaped keys fitted in said slots and extending into said grooves, each of said keys having substantially parallel sides and a flatted edge abutting said bottom surfaces and being tilted in their respective slots to define oppositely inclined wedges to prevent relative movement of said members along the shafts toward each other, and means for forcing said members into engagement with the key associated therewith to secure said members against longitudinal movement therebetween.

3. The combination claimed in claim 2 in which the arcs of the arcuate shaped slots and arcuate shaped keys are each of substantially the same radius and in which the length of arc of each key exceeds that of the associated slot.

4. The combination claimed in claim 2 in which said slots are positioned approximately 180 degrees apart in the shaft.

References Cited in the file of this patent

UNITED STATES PATENTS

| | | |
|---|---|---|
| 681,861 | Smith | Sept. 3, 1901 |
| 743,628 | Estes | Nov. 10, 1903 |
| 907,300 | Sturtevant | Dec. 22, 1908 |
| 1,025,278 | Kirchhoff | May 7, 1912 |
| 1,037,682 | Streeper | Sept. 3, 1912 |
| 1,140,855 | Shaw | May 25, 1915 |
| 1,339,852 | Lockhart | May 11, 1920 |
| 1,539,962 | Seufert et al. | June 2, 1925 |
| 1,799,167 | Hulsebos | Apr. 7, 1931 |